(12) United States Patent
Ertel

(10) Patent No.: US 12,534,301 B2
(45) Date of Patent: Jan. 27, 2026

(54) TENSIONING SYSTEM FOR DUAL BELT CONVEYOR

(71) Applicant: Dorner Mfg. Corp., Hartland, WI (US)

(72) Inventor: Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 87 days.

(21) Appl. No.: 18/664,801

(22) Filed: May 15, 2024

(65) Prior Publication Data

US 2024/0383691 A1 Nov. 21, 2024

Related U.S. Application Data

(60) Provisional application No. 63/502,445, filed on May 16, 2023.

(51) Int. Cl.
  *B65G 23/44* (2006.01)
(52) U.S. Cl.
  CPC .................................. *B65G 23/44* (2013.01)
(58) Field of Classification Search
  None
  See application file for complete search history.

(56) References Cited

U.S. PATENT DOCUMENTS

| | | | | |
|---|---|---|---|---|
| 5,174,435 A | * | 12/1992 | Dorner | B65G 23/44 198/816 |
| 5,896,979 A | * | 4/1999 | Hokari | G03G 15/0194 198/814 |
| 6,997,307 B2 | * | 2/2006 | Iseli | B65G 23/44 198/813 |
| 7,957,672 B2 | * | 6/2011 | Kato | G03G 15/754 399/121 |
| 11,535,455 B1 | * | 12/2022 | Ertel | B65G 23/44 |
| 2003/0183493 A1 | * | 10/2003 | Ertel | B65G 23/44 198/813 |
| 2013/0264176 A1 | * | 10/2013 | Knas | B65G 23/44 198/835 |
| 2015/0329292 A1 | * | 11/2015 | Kawanami | B65G 39/16 198/813 |
| 2018/0319602 A1 | * | 11/2018 | German | B65G 39/09 |

FOREIGN PATENT DOCUMENTS

| | | |
|---|---|---|
| JP | H04138021 U | 12/1992 |
| JP | 2010285227 A * | 12/2010 |

\* cited by examiner

*Primary Examiner* — Gene O Crawford
*Assistant Examiner* — Muhammad Awais
(74) *Attorney, Agent, or Firm* — David L. Principe; Phillips Lytle LLP

(57) ABSTRACT

A tensioning system for a conveyor belt having a center drive. The tensioning system allows a user to increase or decrease the tension in a conveyor belt that passes around a drive pulley and a pair of tension rollers. The tensioning system allows a user to simultaneously rotate each of the tension rollers into a different position relative to the drive pulley by means of adjustment arms controlled by a pinion to increase or decrease the tension on the conveyor belt.

20 Claims, 12 Drawing Sheets

TENSIONING SYSTEM FOR DUAL BELT CONVEYOR

CROSS-REFERENCE TO RELATED APPLICATION

This application claims priority benefit of U.S. Provisional Patent Application No. 63/502,445 entitled "Tensioning System for Dual Belt Conveyor" filed on May 16, 2023, which is incorporated herein by reference.

BACKGROUND

The present disclosure generally relates to a tensioning system for adjusting the tension in a conveyor belt. More specifically, the present disclosure relates to a tensioning system for a conveyor belt that passes over a drive pulley and a pair of tension rollers positioned on opposite sides of the drive pulley.

Presently, conveyor systems exist that are used to accurately move a support pallet between various stations in which actions are performed on items supported on the pallet. As an example, the Dorner 2200 Series Precision Move Pallet System includes a pair of spaced conveyor belts that support opposite sides of a support pallet. The two spaced conveyor belts are moved at the same speed to move the support pallet in the desired direction along the length of the conveyor frame.

Since the conveyor belts in such a conveyor system must be driven at the same speed to accurately move the support platform, many conveyor systems include a common, center drive that operates to rotate the drive roller for each of the two space conveyor belts. One variable that can affect the load carrying capacity of each of the two conveyor belts is the tension in the conveyor belts. The present disclosure provides a tensioning system for each of the two conveyor belts of the pallet conveyor system.

SUMMARY

With parenthetical reference to the corresponding parts, portions or surfaces of the disclosed embodiment, merely for the purposes of illustration and not by way of limitation, the present invention meets the above described need by providing a tensioning system for a conveyor belt having a center drive. The tensioning system allows a user to increase or decrease the tension in a conveyor belt that passes around a drive pulley (42) and a pair of tension rollers (44, 46). The tensioning system allows a user to simultaneously move each of the tension rollers (44, 46) to increase or decrease the tension on the conveyor belt.

In one embodiment, the tensioning system provides a tension adjustment assembly (38). The assembly includes a drive shaft (76). A drive pulley (42) is mounted on the drive shaft (76).

A first tension roller (44) is disposed in spaced apart relation to the drive pulley (42). The first tension roller (44) has a first surface configured to rotate about a first central axis.

A second tension roller (46) is disposed in spaced apart relation to the drive pulley (42). The second tension roller (46) has a second surface configured to rotate about a second central axis.

A belt (20) is disposed in contact with the first surface on the first tension roller (44) and the second surface on the second tension roller (46). The belt (20) is configured for driven engagement with the drive pulley (42).

The first tension roller (44) is supported on a first inner face (68) that is configured to rotate about a first fixed point that may be defined by a fixed mounting pin (72) disposed in spaced apart relation to the first central axis. The first inner face (68) is configured to rotate between a first position and a second position relative to the drive pulley (42).

The second tension roller (46) is supported on a second inner face (68) that rotates about a second fixed point that may be defined by a fixed mounting pin (72) disposed in spaced apart relation to the second central axis. The second inner face (68) is configured to rotate between a first position and a second position relative to the drive pulley (42).

A first adjustment arm (82) is connected to the first tension roller (44). The first adjustment arm (82) has an opening (84) bordered by a series of spaced teeth (86).

A second adjustment arm (83) is connected to the second tension roller (46). The second adjustment arm (83) has an opening (84) bordered by a series of spaced teeth (86).

A pinion (88) has teeth (89) disposed thereon. The pinion (88) extends into the openings (84) in the first and second adjustment arms (82, 83) such that the teeth (89) on the pinion (88) engage with the series of spaced teeth (86) on the first and second adjustment arms (82, 83).

Rotation of the pinion (88) in a first direction causes the first and second tension rollers (44, 46) to rotate away from the drive pulley (42) which decreases the path length for the belt (20) thereby reducing the tension on the belt (20).

In another embodiment a conveyor system (10) has a conveyor frame (22) that extends from a first end to a second end. The conveyor frame (22) defines a horizontal conveying surface for receiving a conveyor belt (20).

A side rail (104) extends upward from the conveyor frame (22). The side rail (104) extends above the horizontal conveying surface. The side rail (104) is connected to the conveyor frame (22) by at least one frangible portion (129).

The conveyor system (10) is configured such that at least a portion of the side rail (104) of the conveyor frame (22) can be removed via the frangible portion (129) such that lateral access to the conveyor belt (20) is provided at the location where the side rail (104) has been removed.

An attachment bracket (28) is mounted to the first end of the conveyor frame (22). The attachment bracket (28) supports a roller (30). The roller (30) is configured to allow the conveyor belt (20) to transition between an upper and a lower run on the conveyor system (10). The attachment bracket (28) has a side rail (114) connected to the attachment bracket (28) by a bendable portion (139).

The conveyor system (10) is configured such that removal of the at least a portion of the side rail (104) on the conveyor frame (22) and the side rail (114) on the attachment bracket (28) provides for positioning a second conveyor system (10) adjacent to the first conveyor system (10) to allow articles or a support pallet to move laterally on to the conveyor belt (20).

A wear strip (106) may be disposed in an upper receiving cavity of the conveyor frame (22).

Various other features, objects and advantages of the invention will be made apparent from the following description taken together with the drawings.

DETAILED DESCRIPTION

Figure 1:
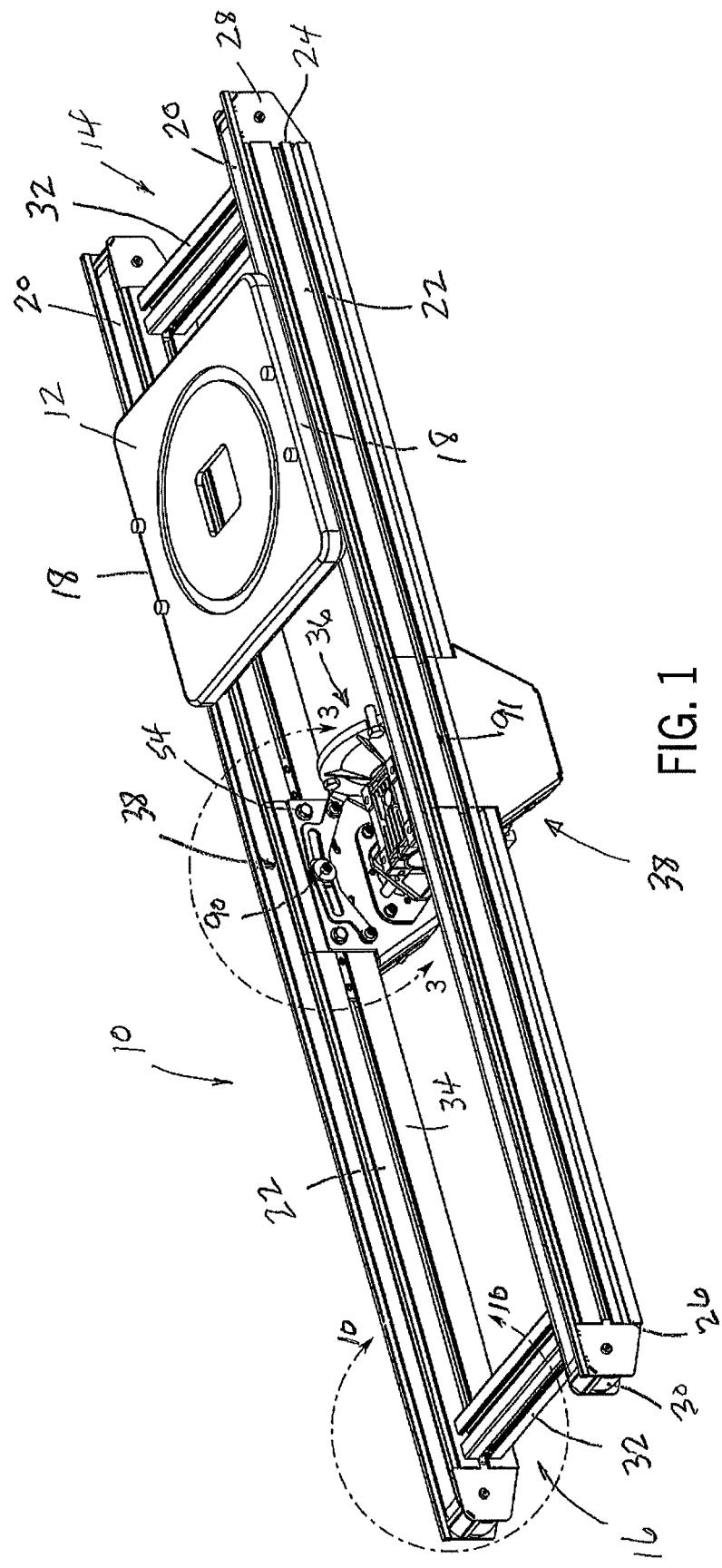
FIG. 1 is a perspective view of the dual belt pallet conveyor system of the present disclosure.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

FIG. 1 illustrates a dual belt pallet conveyor system 10 constructed in accordance with the present disclosure. The conveyor system 10 shown in FIG. 1 is designed to move a support pallet 12 along the length of the conveyor system 10 from a first end 14 to a second end 16. The pallet 12 is designed to support an item or piece of machinery that is moved along the length of the conveyor system 10 to accurately position the item or machinery in a desired location. As shown in FIG. 1, the support pallet 12 includes a pair of side edges 18 that are each supported by a conveyor belt 20 that is movable along one of the pair of spaced conveyor frames 22. In the embodiment shown, each of the conveyor frames 22 is an extruded aluminum frame that extends from a first frame end 24 to a second frame end 26. Each of the first and second frame ends 24, 26 receives a pair of roller support brackets 28 that rotatably support an end roller 30. The end roller 30 is freely rotatable between the roller support brackets 28 such that the endless conveyor belt 20 can transition between an upper run and a lower run over each of the two end rollers 30, as is well-known.

As further shown in FIG. 1, the pair of spaced conveyor frames 22 are joined together and supported by a plurality of tie brackets 32. The tie brackets 32 provide lateral support for the pair of spaced conveyor frames 22 and are each preferably formed from an extruded aluminum material. The tie brackets 32 are each connected to an inner surface 34 of the conveyor frame 22 utilizing conventional attachment techniques, such as by utilizing a t-slot formed on the inner surface 34.

As shown in FIG. 1, the conveyor system 10 includes a center drive 36 that is operable to simultaneously drive both of the pair of spaced conveyor belts 20. In addition to the center drive 36, the conveyor system 10 further includes a pair of tension adjustment assemblies 38 that are each separately adjustable to modify the tension on each of the pair of spaced conveyor belts 20. The details of the tension adjustment assemblies 38 will be described in greater detail below.

Figure 2:
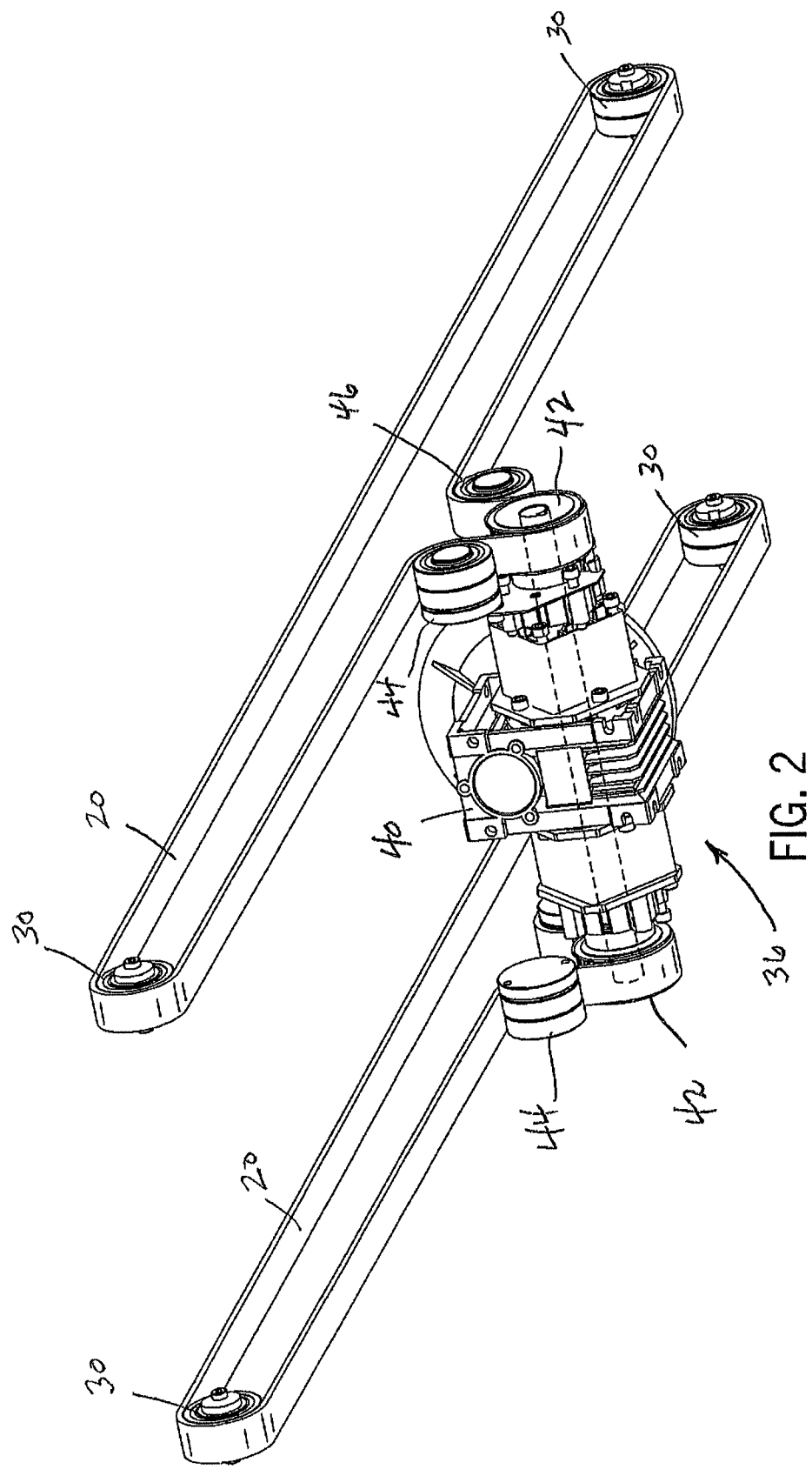
FIG. 2 is a bottom perspective view of the drive assembly and the pair of conveyor belts of the pallet conveyor system.

FIG. 2 illustrates the components of the center drive assembly 36. The center drive assembly 36 includes an electric drive motor 40 that includes a center drive shaft that receives a pair of drive pulleys 42 located on opposite ends of the center drive shaft. The drive pulleys 42 are driven by the drive motor 40 and provide the driving force to move each of the two conveyor belts 20. In the embodiment illustrated, the conveyor belts 20 are timing belts that include ridges on the inner surface that engage grooves formed in the outer surface of the drive pulleys 42. Such an arrangement provides for precise movement of the conveyor belts 20.

As shown in FIG. 2, the lower run of each of the two conveyor belts 20 passes over a first tension roller 44 before passing around the outer surface of the drive pulley 42. The lower run of the conveyor belt then passes around a second tension roller 46. The pair of tension rollers 44, 46 are movable relative to the drive pulley 42 to increase or decrease the travel distance for the conveyor belt, thereby changing the amount of tension on each of the pair of conveyor belts 20. The tension rollers 44, 46 include a roller portion, a bearing and a support structure having a face portion 68. The roller portion rotates via engagement with the belt being driven by the drive pulley 42. The roller portion rotates independently of the support structure of the roller 44, 46. The position of the support structure relative to the drive pulley 42 provides for adjustment of the tension on the belt as described herein.

FIGS. 3-9 illustrate the configuration of the tension adjustment assembly 38 constructed in accordance with the present disclosure. As stated previously, a tension adjustment assembly 38 is associated with each of the pair of conveyor belts 20. It is also contemplated that the tension adjustment assembly 38 could be used with a conveyor system that includes only one conveyor belt.

Figure 7:
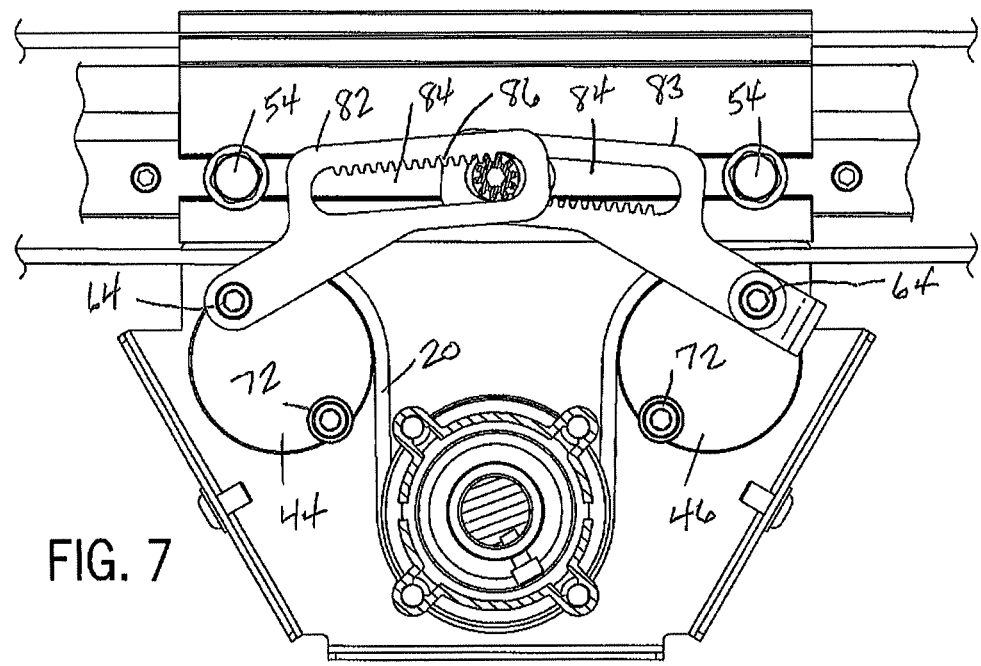
FIG. 7 is a side view of the tension adjustment assembly with the outer housing removed in fully extended position.
Figure 8:
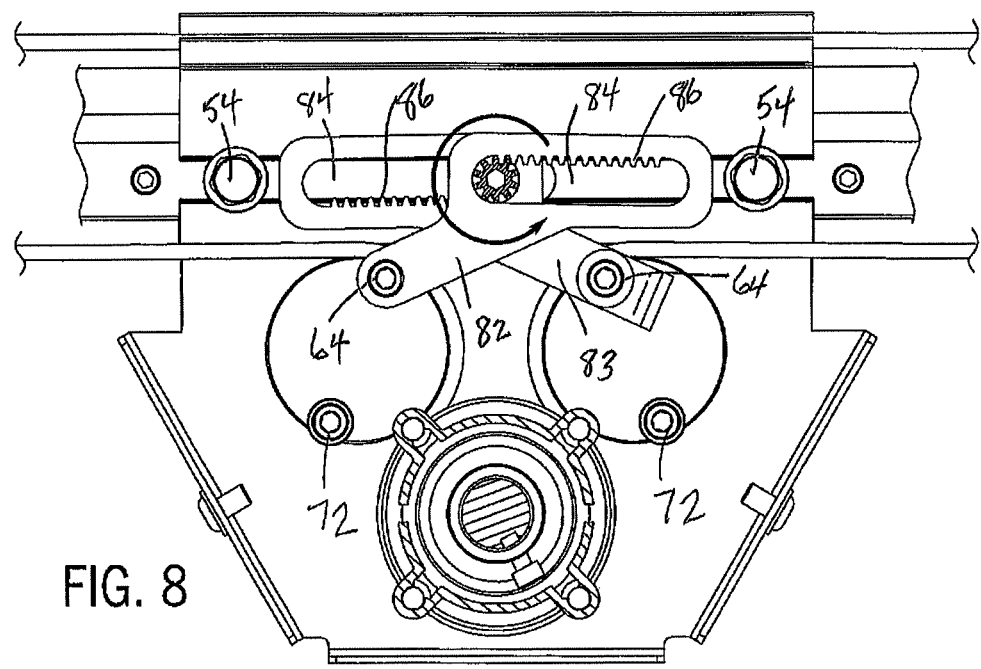
FIG. 8 is a side view of the tension adjustment assembly with the outer housing removed in fully retracted position.
Figure 9:
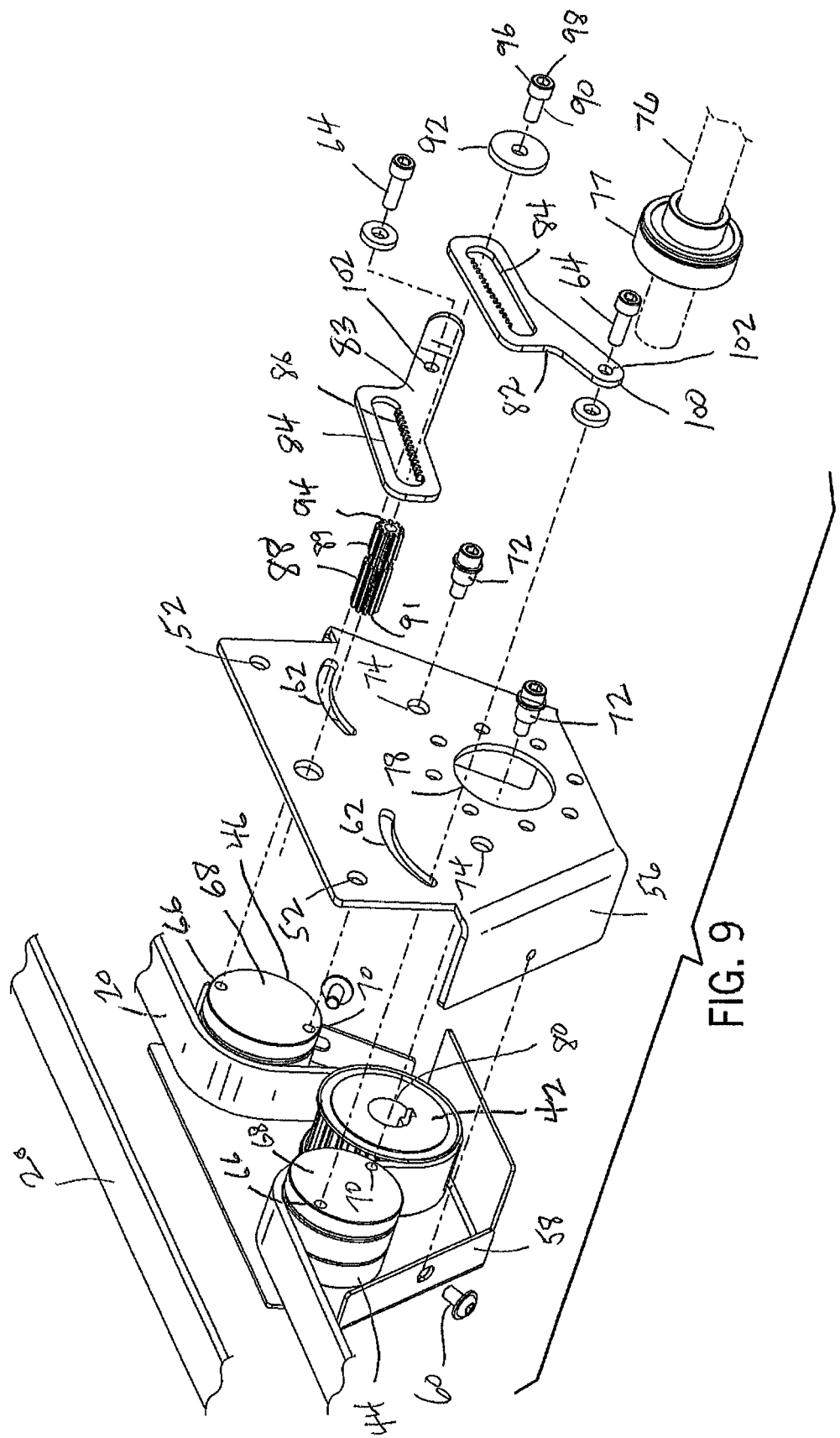
FIG. 9 is an exploded view of the tension adjustment assembly.

The tension adjustment assembly 38 includes an outer housing 48 that includes an attachment portion 50 having a pair of attachment holes 52. The attachment holes 52 each receive a connector 54 that is used to secure the tension adjustment assembly 38 to the inner surface 34 of the conveyor frame 22, as is shown in FIGS. 1, 7 and 8. As best shown in FIG. 9, housing 48 is formed from a pair of metallic plates that are bent to define an inner housing portion 56 and an outer housing portion 58. The inner and outer housing portions 56, 58 are joined by a connector 60 on each side of the outer housing.

The inner housing portion 56 includes a pair of curved adjustment slots 62 that are removed portions of the metal plate used to form the inner housing portion 56. Each of the adjustment slots 62 has a width that is designed to receive an adjustment pin 64 such that the adjustment pin is movable along the arc length of the adjustment slot 62. The adjustment pin 64 includes a shaft portion that extends through one of the adjustment slots 62 and the outer end of the adjustment pin 64 is received within the receiving hole 66 formed in the inner face 68 of one of the tension rollers 44, 46. Each of the tension rollers 44, 46 further includes a second receiving hole 70 that receives a fixed mounting pin 72. The mounting pin 72 includes a shaft portion that extends through one of a pair of holes 74 formed in the front face of the inner housing portion 56 of the housing 48.

As will be described in greater detail below, each of the adjustment pins 64 is movable within the adjustment slot 62 to adjust the location and rotational position of the respective tension roller 44, 46 relative to the drive pulley 42. In the embodiment shown, the drive pulley 42 includes drive teeth along its outer surface that engage a corresponding ribbed outer surface of the conveyor belt 20 to accurately control the movement of the conveyor belt 20 and to prevent any slippage of the conveyor belt 20 along the outer surface of the drive pulley 42. As further shown in FIG. 9, drive shaft 76 of the electric drive motor is supported by a bearing housing 77 and extends through the center opening 78 such that the outer end of the drive shaft 76 is received within a keyed center opening 80 formed as part of the drive pulley 42. Rotation of the drive shaft 76 causes rotation of the drive pulley 42, thereby causing movement of the conveyor belt 20 over the outer surfaces of the tension rollers 44, 46.

Figure 3:
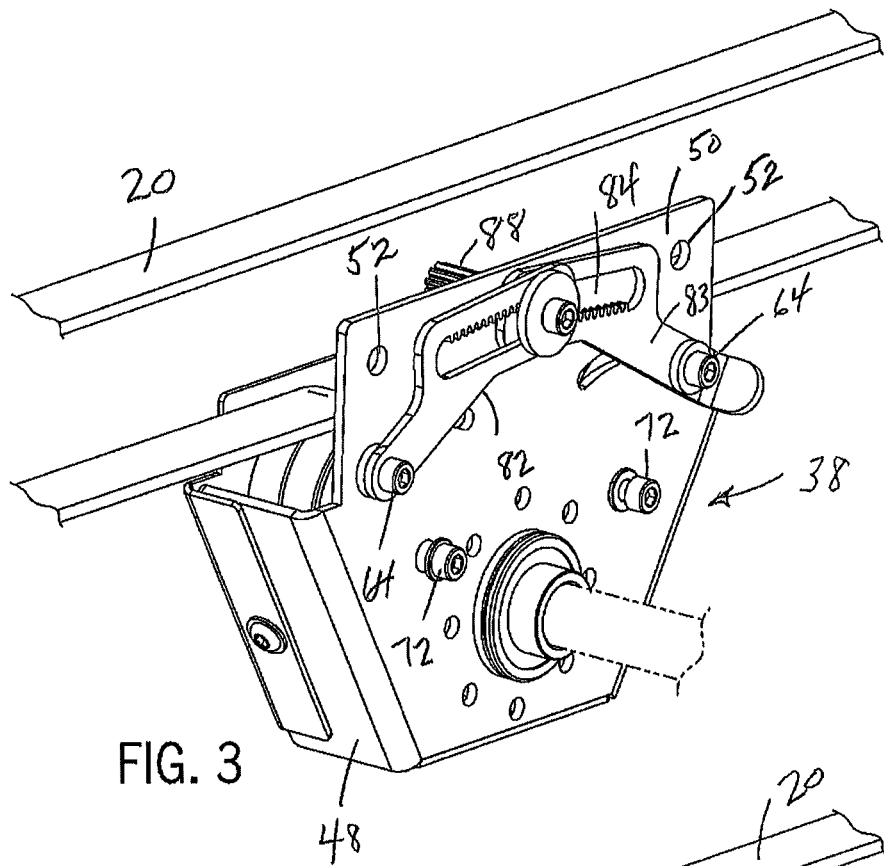
FIG. 3 is a side perspective view taken along line 3-3 of FIG. 1 showing the tension adjustment assembly in the fully extended position.

Referring now to FIGS. 3 and 9, the tension adjustment assembly 38 includes a pair of adjustment arms 82 and 83. Each of the adjustment arms 82, 83 includes a center opening 84 that includes a series of spaced teeth 86. In the embodiment shown in FIG. 3, the left adjustment arm 82 includes the series of teeth that are formed on a generally horizontal upper surface that defines part of the center opening 84. The right adjustment arm 83 includes a corresponding series of teeth 86 that are formed on a generally horizontal lower surface that defines part of the center opening 84. The series of teeth 86 formed as part of the adjustment arms 82, 83 are spaced from each other and are designed to interact with outer teeth 89 formed on a pinion 88 that extends through the pair of adjustment arms 82, 83. The pinion 88 is designed to receive a pin 90 that passes through a washer 92 and is received in the end 94 of the pinion 88. The pin 90 includes a head portion 96 that includes a center opening 98 for attaching the pin 90 to the end 94 of the pinion 88. The pinion 88 is formed having a second end 91 that includes an internal bore having a hexagonal cross section. The hexagonal bore formed in the second end 91 is accessible from the exterior of the conveyor frame 22, as shown in FIG. 1. The hexagonal bore is designed to receive a corresponding tool that can be rotated to thus rotate the pinion 88. When the user rotates the pinion 88 using a tool, rotation of the pinion 88 causes the outer teeth 89 on pinion 88 to interact with the teeth 86 formed at each of the adjustment arms 82, 83. Such rotation thus causes the center openings 84 of each of the adjustment arms 82, 83 to move laterally.

Each of the adjustment arms 82, 83 includes an outer attachment end 100 that includes an opening 102 that receives the adjustment pin 64. When the pinion 88 rotates in a first direction, the adjustment pins 64 move in a first direction in the adjustment slots 62. When the pinion 88 is rotated in an opposite, second direction, the adjustment pins 64 move in the opposite direction within the adjustment slot 62. Since each of the adjustment pins 64 is attached to the outer face of the pair of tension rollers 44, 46, rotation of the pinion 88 thus adjusts the position of each of the tension rollers 44, 46. As the tension rollers 44, 46 are moved, the tension rollers 44, 46 either increase or decrease the amount of tension applied to the conveyor belt 20.

Figure 5:
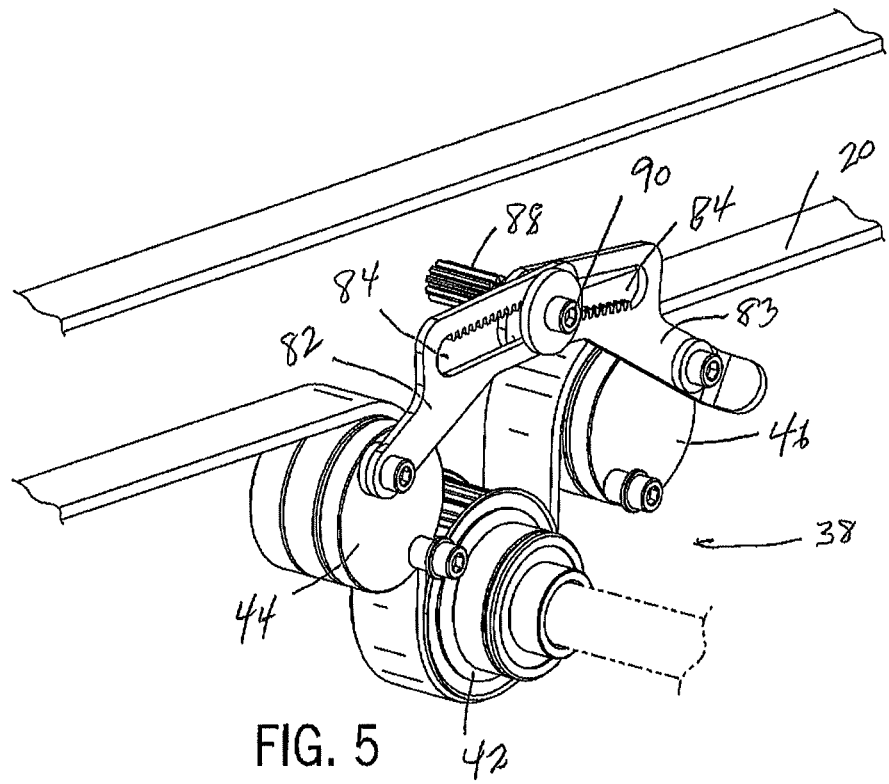
FIG. 5 is a side perspective view of the tension adjustment assembly with the outer housing removed in fully extended position.

FIGS. 3 and 5 illustrate the tension adjustment assemblies 38 in their fully extended position. In the fully extended position, the pinion 88 and the attached drive pin 90 are received in the innermost ends of each of the pair of center openings 84. In this location, the tension rollers 44, 46 are moved away from the drive roller 42, which decreases the path length for the lower run of the conveyor belt 20.

Figure 4:
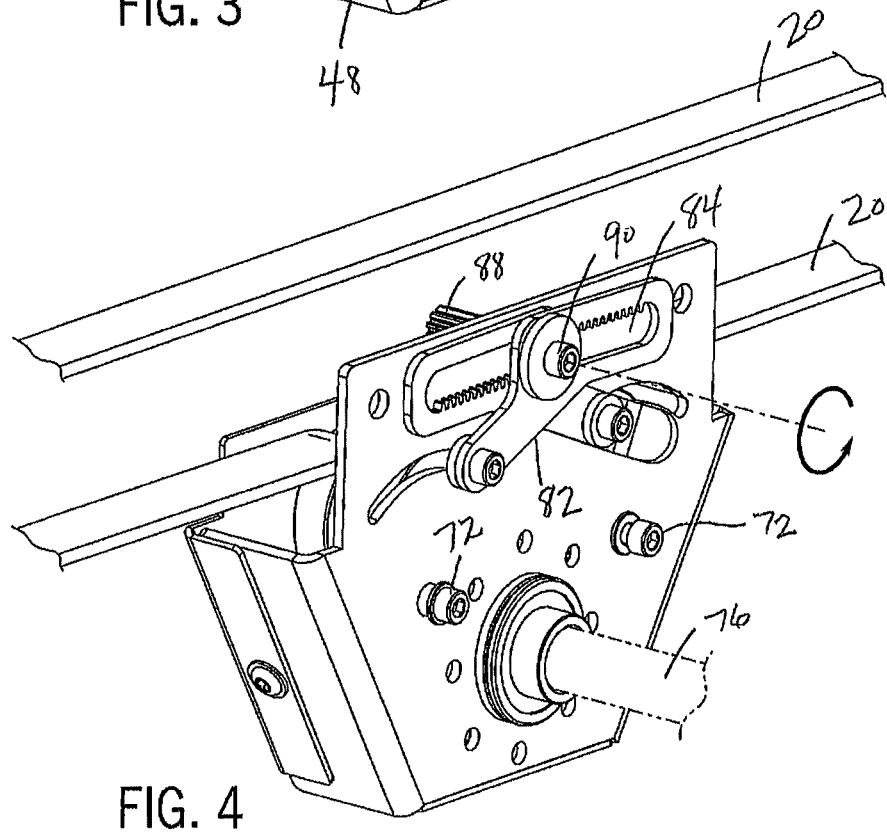
FIG. 4 is a side perspective view of the tension adjustment assembly in the fully retracted position.
Figure 6:
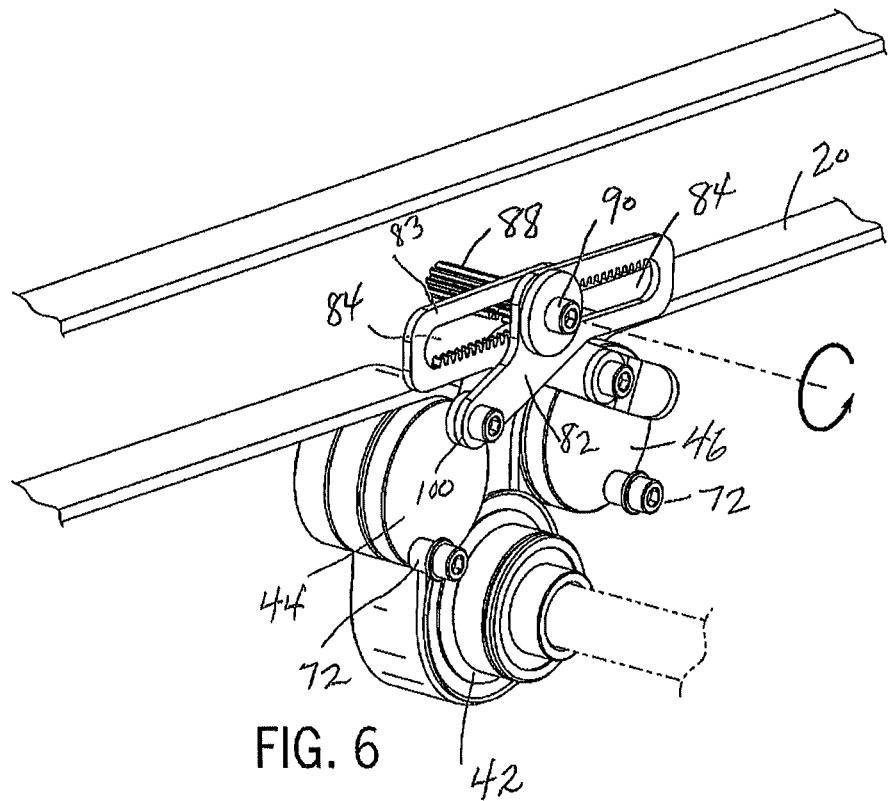
FIG. 6 is a side perspective view of the tension adjustment assembly with the outer housing removed in the full retracted position.

Referring now to FIGS. 4 and 6, when the pinion 88 is rotated as shown by the arrow in the figures, the pinion 88 moves along each of the pair of center openings 84, which causes the attachment end 100 to move closer to the drive roller 42. This movement increases the path length of the lower run of the conveyor belt 20, thereby increasing the tension on the conveyor belt 20. As can be understood in the drawing figures, by rotating the pinion 88, the position of the tension rollers 44, 46 can be adjusted. As described previously, a mounting pin 72 is stationary and thus prevents a portion of the tension rollers 44, 46 from moving.

As can be understood in FIG. 1, the conveyor system 10 includes a pair of separate tension adjustment assemblies 38 such that the tension on the two separate conveyor belts 20 can be adjusted independently of each other. Thus, should one conveyor belt 20 become stretched relative to the other conveyor belt, the tension adjustment assembly 38 for the conveyor belt needing tightening can be adjusted without affecting the tension on the other conveyor belt. As shown in FIG. 1, a user can access the end 91 of the pinion 88 from the exterior of the pair of spaced conveyor frames 22.

Figure 10:
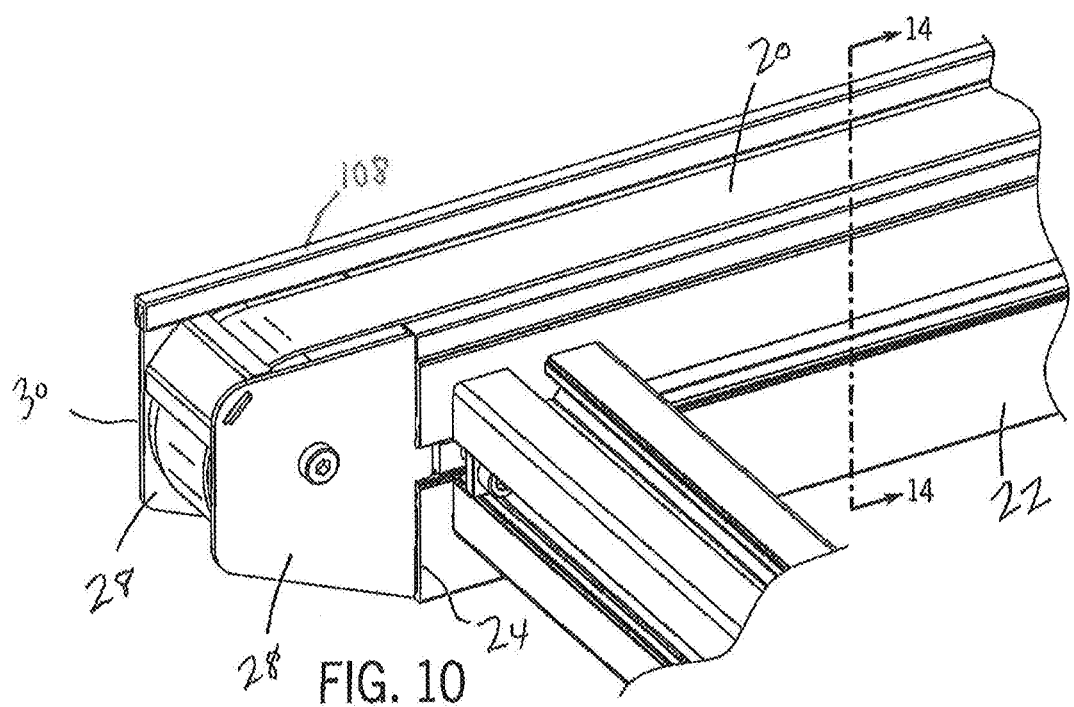
FIG. 10 is a side perspective view taken along line 10-10 of FIG. 1 showing of one of the conveyor frames with a protective guide located on the outer side rail.
Figure 11:
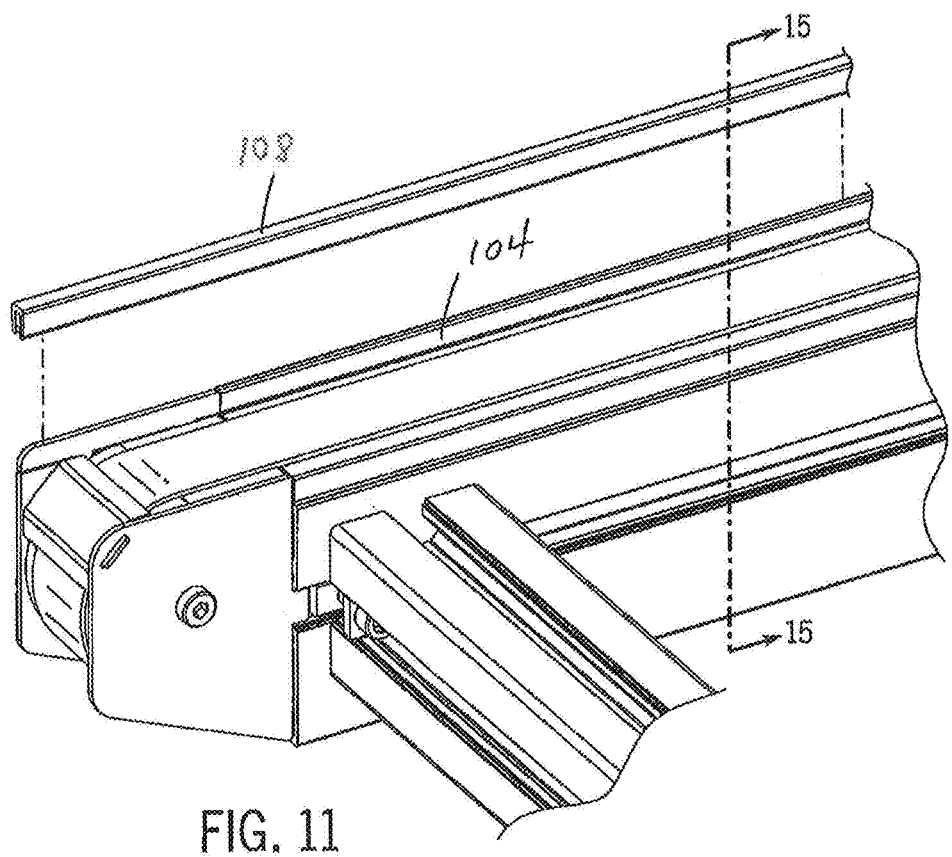
FIG. 11 is an exploded view of the protective guide.
Figure 15:
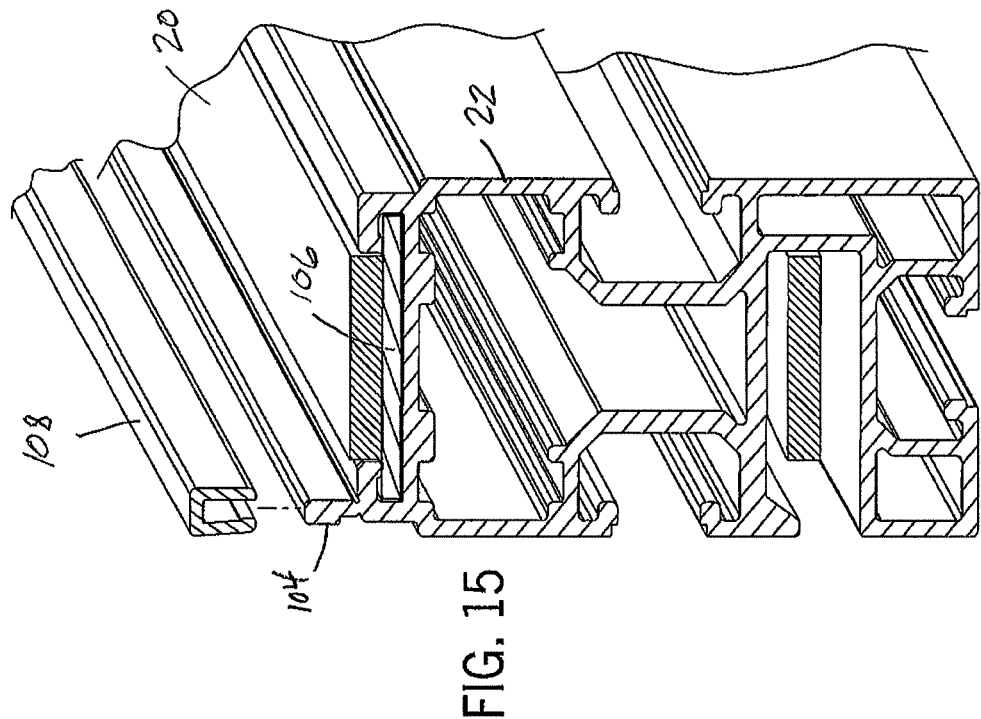
FIG. 15 is a section view taken along line 15-15 of FIG. 11.
Figure 14:
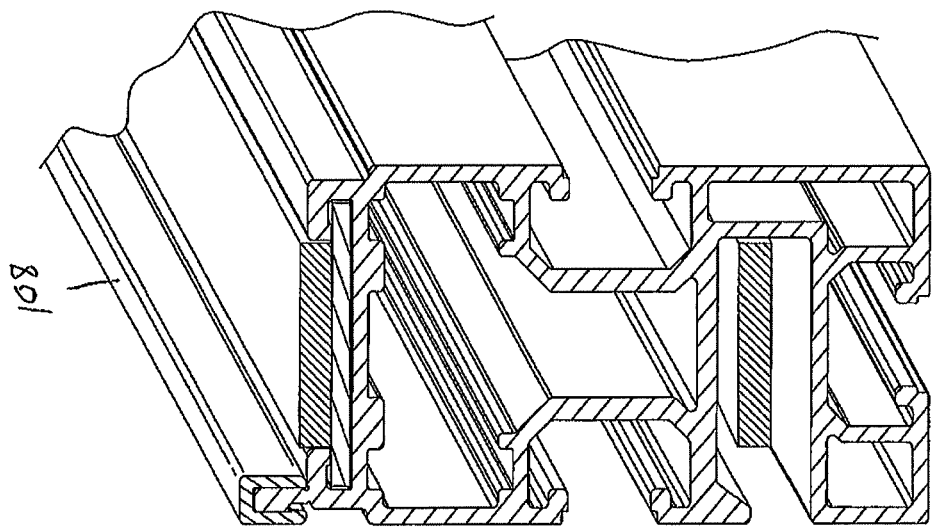
FIG. 14 is a section view taken along line 14-14 of FIG. 10.

In addition to the tension adjustment assemblies 38 shown and described, the conveyor system of the present disclosure also includes a unique conveyor frame construction that allows the physical configuration of the conveyor frame to be adjusted to provide access to the conveyor belt at selected locations. As shown in FIG. 10, the conveyor frame 22 is formed from a section of extruded aluminum and receives a pair of roller support brackets 28 mounted to the first or second frame end 22 or 24. The roller support brackets 28 each rotatably support an end roller 30 that allows the conveyor belt 20 to transition between an upper and a lower run. As shown in FIGS. 10 and 11, the conveyor frame includes a side rail 104. As best shown in FIGS. 14 and 15, the conveyor frame 22 includes an upper receiving cavity that receives a wear strip 106 that is formed from a durable plastic material. The wear strip 106 is in contact with the conveyor belt 20. The side rail 104 extends above the outer surface of the conveyor belt 20 to provide a stop surface for any materials that are moving laterally relative to the conveyor belt 20.

As shown in FIGS. 14 and 15, a protective guide 108 having a generally U-shaped cross-section is sized to be received on the side rail 104. The protective guide 108 is also formed from a resilient material such as UHMW or similar material. As shown in FIG. 15, the protective guide 108 can be removed from the side rail 108 when desired. The side rail 104 is designed such that the entire side rail 104 or select portions of the side rail 104 can be selectively removed from the conveyor frame 22 as desired.

Figure 16:
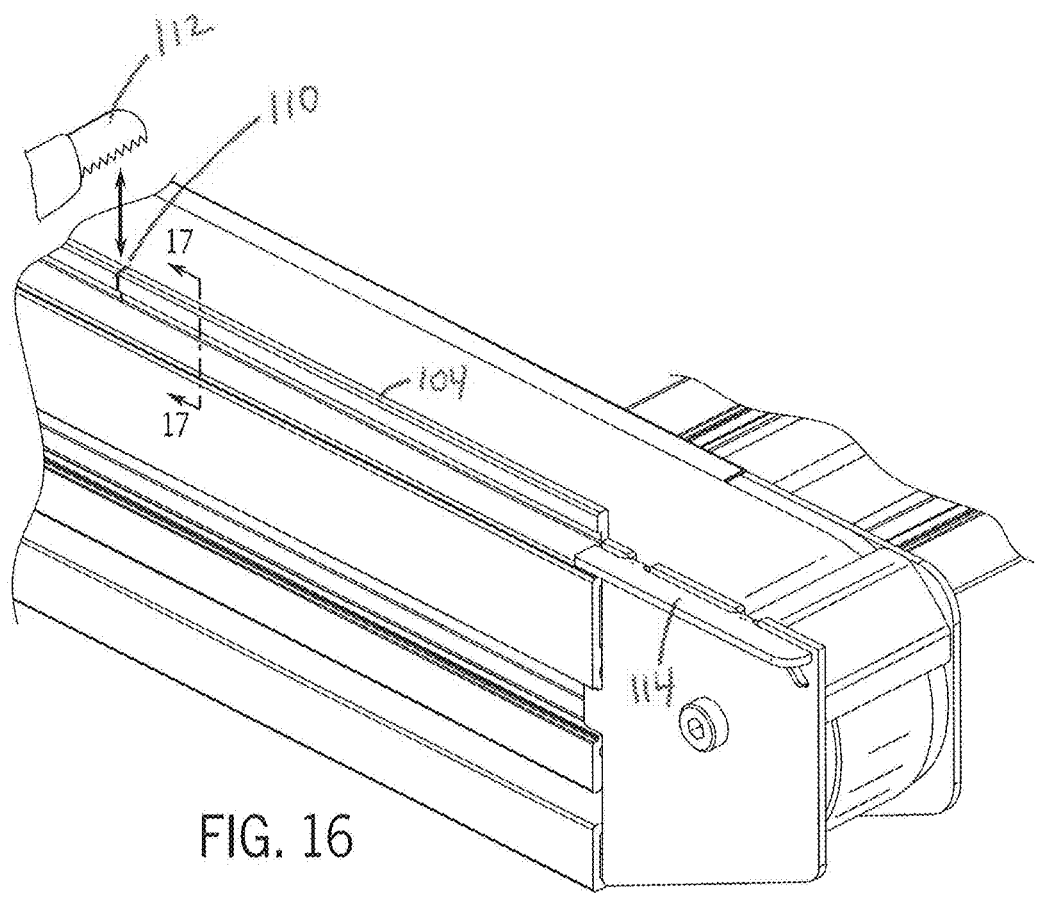
FIG. 16 is a outer side view showing the use of a saw to define a section of the outer side rail to be removed.
Figures 17, 18:
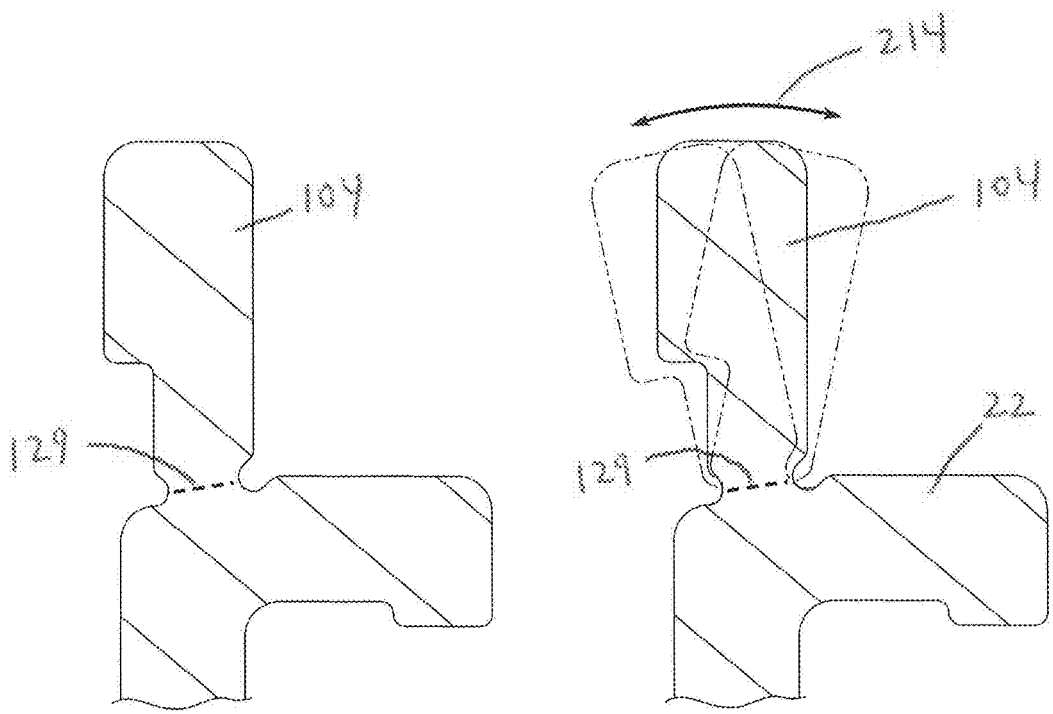
FIG. 17 is a section view taken along line 17-17 of FIG. 16.
FIG. 18 is a section view showing the removal of a section of the outer side rail.
Figure 19:
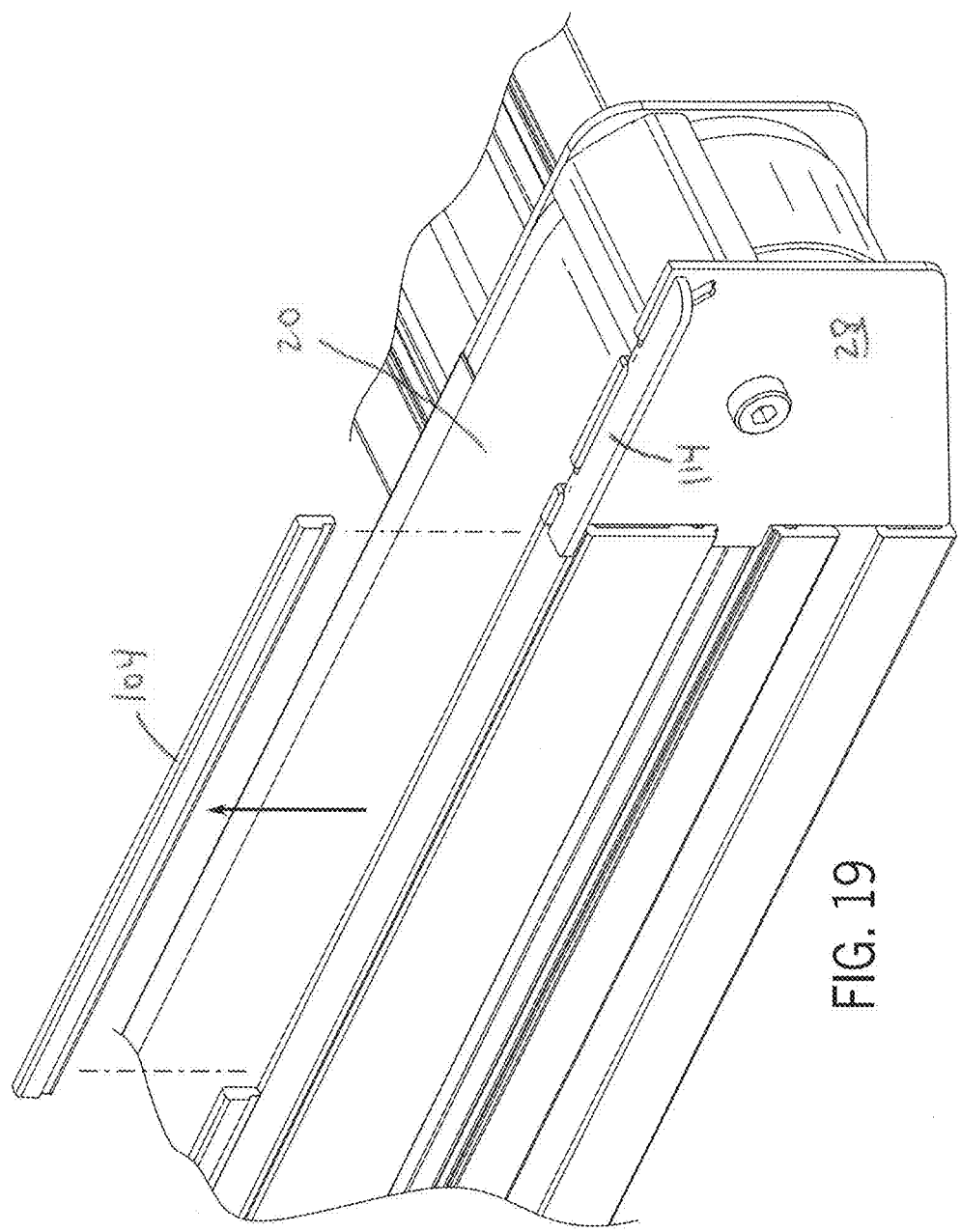
FIG. 19 is a outer side perspective view showing the removal of the section of the outer side rail.

Referring now to FIGS. 16-18, if a user needs or desires to remove a portion of the side rail 104, the user can create a cut 110 in the side rail 104 at a desired location. The cut 110 can be created using any type of hand saw 112, knife or similar tool. Once the saw cut 110 has been formed, the user can repeatedly move the side rail 104 back and forth as shown by arrow 214. This repeated movement creates a fracture of the aluminum material along a frangible portion 129 between the side rail 104 and the remaining portions of the conveyor frame 22 such that a portion of the side rail can be removed as shown in FIG. 19. When the portion of the side rail is removed, lateral access is provided to the conveyor belt 20 at the location where the side rail 104 has been removed.

Figure 12:
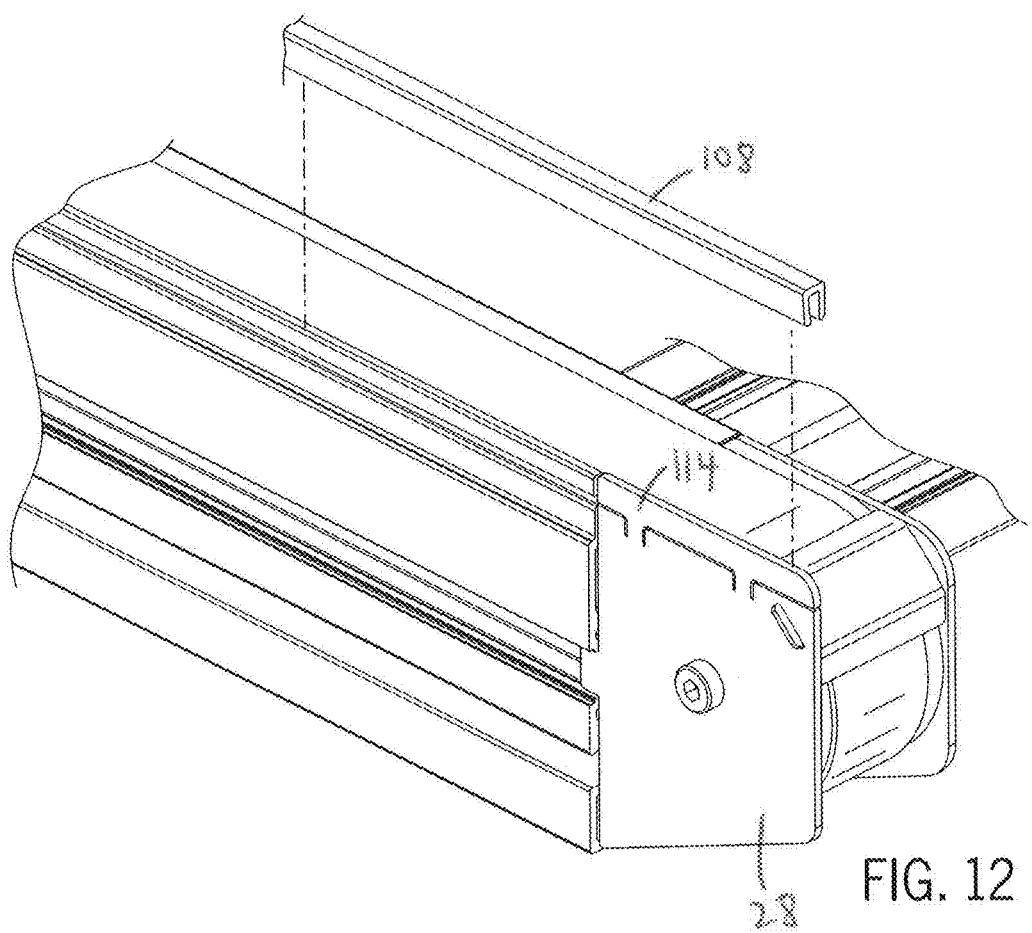
FIG. 12 is an outer side view of the conveyor frame with the protective guide in an exploded position.
Figure 13:
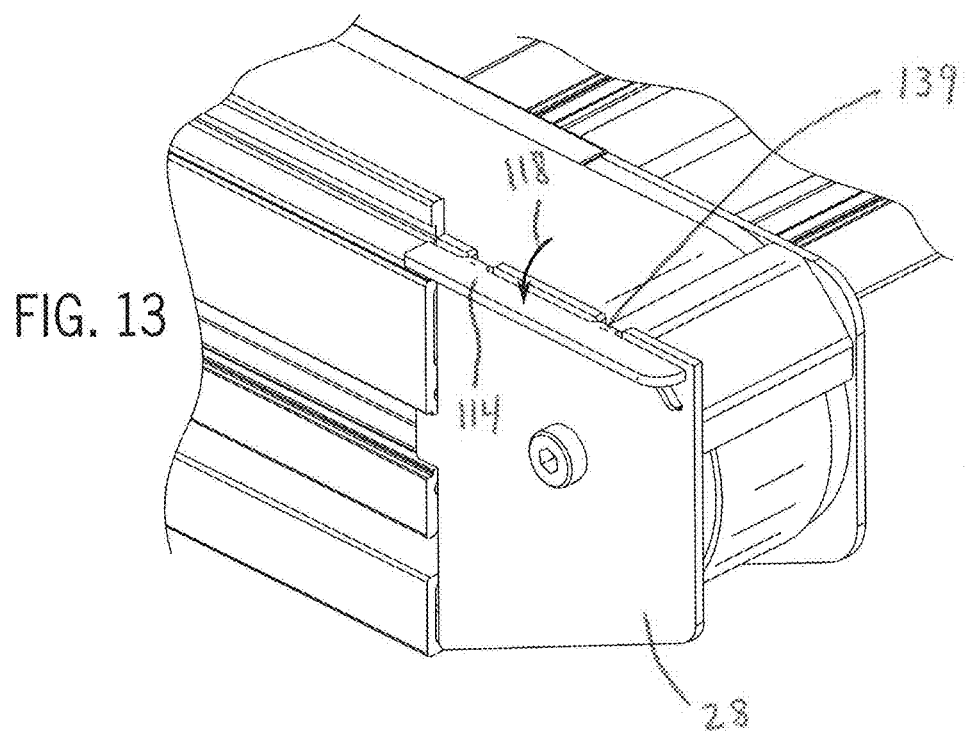
FIG. 13 is an outer side view showing the bending of a portion of the outer side rail.

Referring now to FIGS. 12 and 13, the attachment bracket 28 also includes an upper side rail 114 that is attached to the remaining portions of the attachment bracket 28 utilizing only a pair of attachment tabs 116. The material composition of the rail 114 provides that the user can easily bend the upper side rail 114 as shown by arrow 118 to bend over the upper side rail 114 along a thinned out portion 139 as shown in FIG. 13. In this manner, a user can selectively separate portions of the conveyor frame and bend over the upper side rail 114 of the roller support brackets 28 to provide an area for the pallet to travel over when used in a turning corner.

Figure 20:
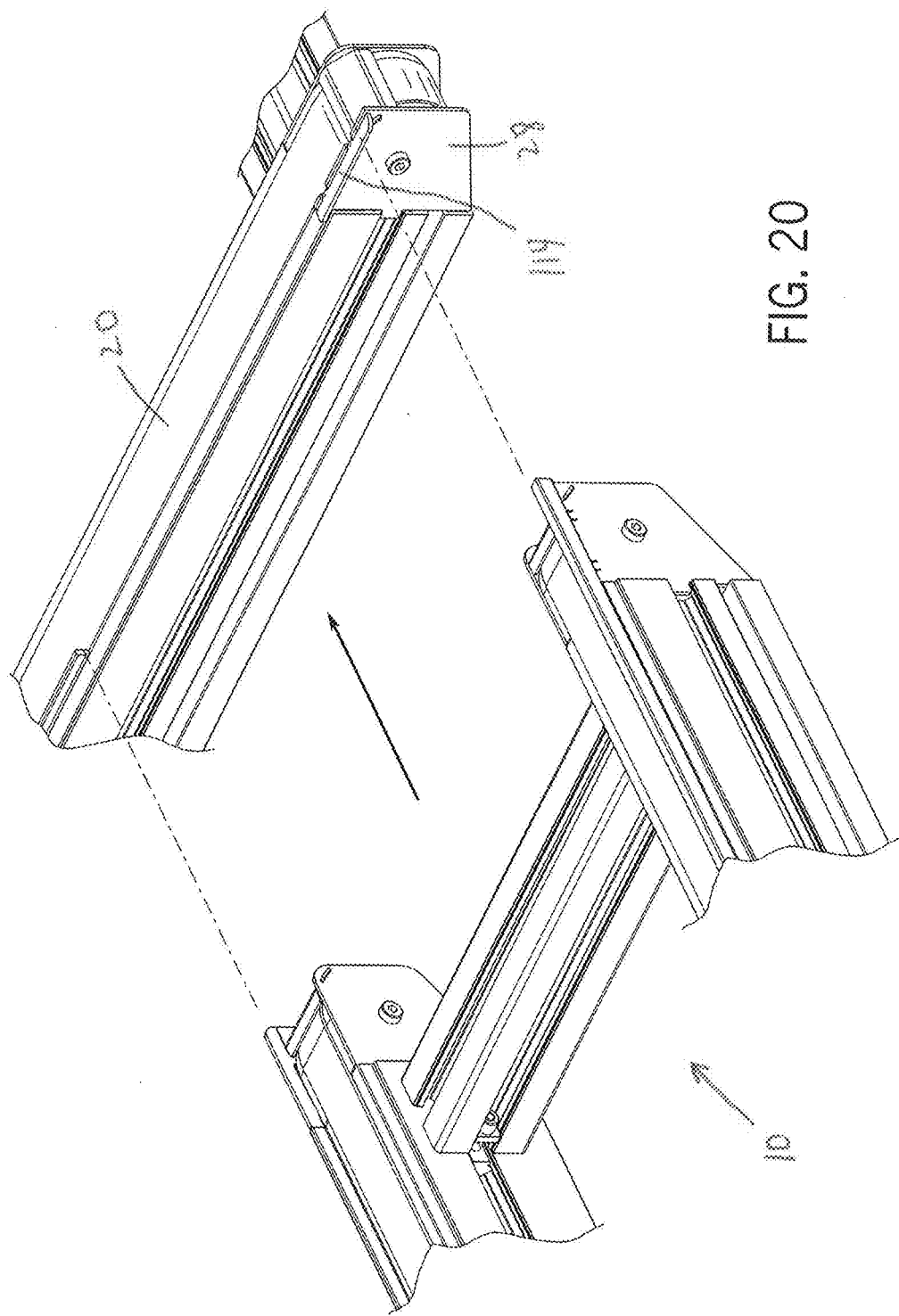
FIG. 20 is a perspective view showing the interaction between two dual belt pallet conveyor systems once the section of the outer side rail is removed.

Once the portions of the side rail 104 have been removed and the side rail 114 of the attachment bracket 28 has been bent over, as shown in FIG. 20, a second conveyor system 10 can be positioned adjacent to the conveyor system to allow articles or a support pallet to move laterally onto the conveyor belt 20. In this manner, the user is able to easily configure each of the conveyor systems for a specific use.

The present invention contemplates that many changes and modifications may be made. Therefore, while the presently-preferred form of the tensioning system for a dual belt conveyor has been shown and described, and several modifications and alternatives discussed, persons skilled in this art will readily appreciate that various additional changes and modifications may be made without departing from the spirit of the invention, as defined and differentiated by the following claims.

What is claimed is:

1. A tension adjustment assembly for use with a conveyor, comprising:
    a drive shaft;
    a drive pulley mounted on the drive shaft;
    a first tension roller disposed in spaced apart relation to the drive pulley, the first tension roller having a first surface configured to rotate about a first central axis;
    a second tension roller disposed in spaced apart relation to the drive pulley, the second tension roller having a second surface configured to rotate about a second central axis;
    a belt disposed in contact with the first surface on the first tension roller and the second surface on the second tension roller, the belt configured for driven engagement with the drive pulley;
    the first tension roller being supported on a first inner face that is configured to rotate about a first fixed point disposed in spaced apart relation to the first central axis, the first inner face configured to rotate between a first position and a second position relative to the drive pulley;
    the second tension roller being supported on a second inner face that rotates about a second fixed point disposed in spaced apart relation to the second central axis, the second inner face configured to rotate between a first position and a second position relative to the drive pulley;
    a first adjustment arm connected to the first tension roller, the first adjustment arm having an opening bordered by a series of spaced teeth;
    a second adjustment arm connected to the second tension roller, the second adjust arm having an opening bordered by a series of spaced teeth;
    a pinion having teeth disposed thereon, the pinion extending into the openings in the first and second adjustment arms such that the teeth on the pinion engage with the series of spaced teeth on the first and second adjustment arms;
    wherein rotation of the pinion in a first direction causes the first and second tension rollers to rotate away from the drive pulley which decreases the path length for the belt thereby reducing the tension on the belt.

2. The tension adjustment assembly of claim 1, wherein the inner face of the first and second tension rollers are connected to the first and second adjustment arms by first and second adjustment pins that move along an arc about the first and second fixed points.

3. The tension adjustment assembly of claim 1 wherein the series of spaced teeth on the first adjustment arm are formed on a generally horizontal upper surface that borders the opening.

4. The tension adjustment assembly of claim 3, wherein the series of spaced teeth on the second adjustment arm are formed on a generally horizontal lower surface that borders the opening.

5. The tension adjustment assembly of claim 1, wherein the assembly is supported by the conveyor.

6. The tension adjustment assembly of claim 1, further comprising an electric drive motor operatively associated with the drive shaft.

7. The tension adjustment assembly of claim 1, wherein the pinion is formed having a second end that includes an internal bore having a geometric shape defined therein.

8. The tension adjustment assembly of claim 7, wherein the second end of the pinion is accessible from the exterior of a frame supporting the conveyor.

9. The tension adjustment assembly of claim 8, further comprising a tool configured to engage with the geometric shape inside the bore in the pinion such that rotation of the tool causes the pinion to rotate.

10. The tension adjustment assembly of claim 1, wherein when the pinion rotates in a second direction opposite the first direction, the first and second adjustment pins move toward each other such that the first and second tension rollers move toward the drive pulley which increases the path length for the belt thereby increasing the tension on the belt.

11. The tension adjustment assembly of claim 1, wherein the drive pulley, first tension roller, and second tension roller are disposed in a housing.

12. The tension adjustment assembly of claim 1, wherein the position of the first and second rollers can be adjusted simultaneously by rotating the pinion.

13. The tension adjustment assembly of claim 1, wherein the drive pulley includes drive teeth along an outer surface, the drive teeth configured to engage a corresponding ribbed outer surface of the belt to control movement of the belt and to prevent slippage of the belt along the outer surface of the drive pulley.

14. A tensioning system for a dual belt conveyor, the tensioning device comprising:
a first tension adjustment assembly having a plate with an opening for receiving a drive shaft;
a drive pulley mounted on a first end of the drive shaft;
a first tension roller disposed in spaced apart relation to the first drive pulley;
a second tension roller disposed in spaced apart relation to the first drive pulley;
a belt disposed in contact with the first tension roller and the second tension roller, the belt configured for driven engagement with the first drive pulley;
the first tension roller having a first inner face rotatably supported independently of the first tension roller by a first fixed mounting pin attached to the plate;
a first adjustment pin connected to the first inner face of the first tension roller, the first adjustment pin configured to rotate about the first fixed mounting pin;
the second tension roller having a second inner face rotatably supported independently of the second tension roller by a second fixed mounting pin attached to the plate;
a second adjustment pin connected to the second inner face of the second tension roller, the second adjustment pin configured to rotate about the fixed mounting pin;
a first adjustment arm connected to the first adjustment pin, the first adjustment arm having an opening bordered by a series of spaced teeth;
a second adjustment arm connected to the second adjustment pin, the second adjust arm having an opening bordered by a series of spaced teeth;
a pinion having teeth disposed thereon, the pinion extending into the openings in the first and second adjustment arms such that the teeth on the pinion engage with the series of spaced teeth on the first and second adjustment arms;
wherein rotation of the pinion in a first direction causes the first and second adjustment arms to move the first adjustment pin and the second adjustment pin away from each other such that the first and second tension rollers move away from the first drive pulley which decreases the path length for the belt thereby reducing the tension on the belt.

15. The tension adjustment assembly of claim 14, wherein the drive shaft is supported by a bearing housing disposed in the opening in the plate and wherein the drive shaft is configured such that the first end of the drive shaft is received within a keyed opening formed in the drive pulley.

16. The tension adjustment assembly of claim 14, wherein the plate is supported by a frame on the conveyor.

17. A conveyor, comprising:
a conveyor frame extending from a first end to a second end, the conveyor frame defining a horizontal conveying surface for receiving a conveyor belt;
a side rail extending upward from the conveyor frame, the side rail extending above the horizontal conveying surface, the side rail connected to the conveyor frame by at least one frangible portion; and,
wherein the conveyor is configured such that at least a portion of the side rail of the conveyor frame can be removed via the frangible portion such that lateral access to the conveyor belt is provided at the location where the side rail has been removed.

18. The conveyor of claim 17, further comprising an attachment bracket mounted to the first end of the conveyor frame, the attachment bracket supporting a roller, the roller configured to allow the conveyor belt to transition between an upper and a lower run on the conveyor, the attachment bracket having a side rail connected to the attachment bracket by a bendable portion.

19. The conveyor of claim 18, wherein the conveyor is configured such that removal of the at least a portion of the side rail on the conveyor frame and bending of the side rail on the attachment bracket provides for positioning a second conveyor adjacent to the conveyor to allow articles or a support pallet to move laterally on to the conveyor belt.

20. The conveyor of claim 17, further comprising a wear strip disposed in an upper receiving cavity of the conveyor frame.

* * * * *